June 1, 1965

C. W. RIPPIE 3,186,929

PROCESS AND APPARATUS FOR MAGNETIC TREATMENT OF GASEOUS OXYGEN

Filed July 10, 1961

INVENTOR.
Charles W. Rippie
BY
Wood, Herron and Evans
ATTORNEYS

3,186,929
PROCESS AND APPARATUS FOR MAGNETIC TREATMENT OF GASEOUS OXYGEN

Charles W. Rippie, Ashland, Ky., assignor to Ashland Oil & Refining Company, Ashland, Ky., a corporation of Kentucky
Filed July 10, 1961, Ser. No. 122,745
22 Claims. (Cl. 204—155)

This invention relates to a process and apparatus for increasing the chemical reactivity of gaseous oxygen. More particularly, it relates to means whereby gaseous oxygen may be activated by subjecting it to a magnetic field such that it will more readily enter into chemical combination with various oxidizable substances, including hydrocarbon fuels and other organic substances and various inorganic compounds.

Ordinarily, gaseous molecular oxygen, for example as it occurs in the atmosphere, is not reactive at normal temperatures in the absence of a reaction promoting catalyst or a highly reactive oxidizable material such as sodium. Direct chemical reaction between gaseous oxygen and oxidizable material is usually effected by heating the oxygen or the oxidizable material or both to an elevated temperature such that the reaction will proceed. Generally speaking, the effect of such thermal activation is to cause the gaseous oxygen molecule $O_2$ to split, forming ionic oxygen which is much more reactive than molecular oxygen and which readily tends to enter into oxidizing reactions.

I have discovered a method and an apparatus whereby gaseous oxygen may be magnetically activated such that its reactivity is greatly enhanced and such that it will more readily and more completely enter into chemical combination under appropriate reaction conditions.

Simply put, I have found that by flowing oxygen, which may be atmospheric oxygen, through a nonmagnetic tube or duct in which there is disposed a ferromagnetic core and around which there is disposed an electromagnet coil which is energized to establish a magnetic field inside the tube in the region of the core, the oxygen is in some manner activated or excited and displays substantially increased chemical reactivity.

The reasons behind the increased reactivity which is demonstrated by oxygen thus treated are not fully understood. It is believed that the magnetic field ionizes at least some of the oxygen. The provision of the ferromagnetic core in the tube through which the oxygen is passed is an important aspect of the invention, although its precise role in effecting the observed excitation is not yet known. Nonetheless, oxygen which has been subjected to such magnetic treatment does enter into reactions more readily and completely than it otherwise would. It is not to be thought that oxygen which has been magnetically treated in accordance with this invention will always react even though it otherwise would not; rather the overall effect of such treatment is generally to enhance the chemical reactivity of the oxygen such that it will tend to enter into chemical combination at least in many instances more easily or more thoroughly or at less severe process conditions than otherwise.

Figures 1, 2:
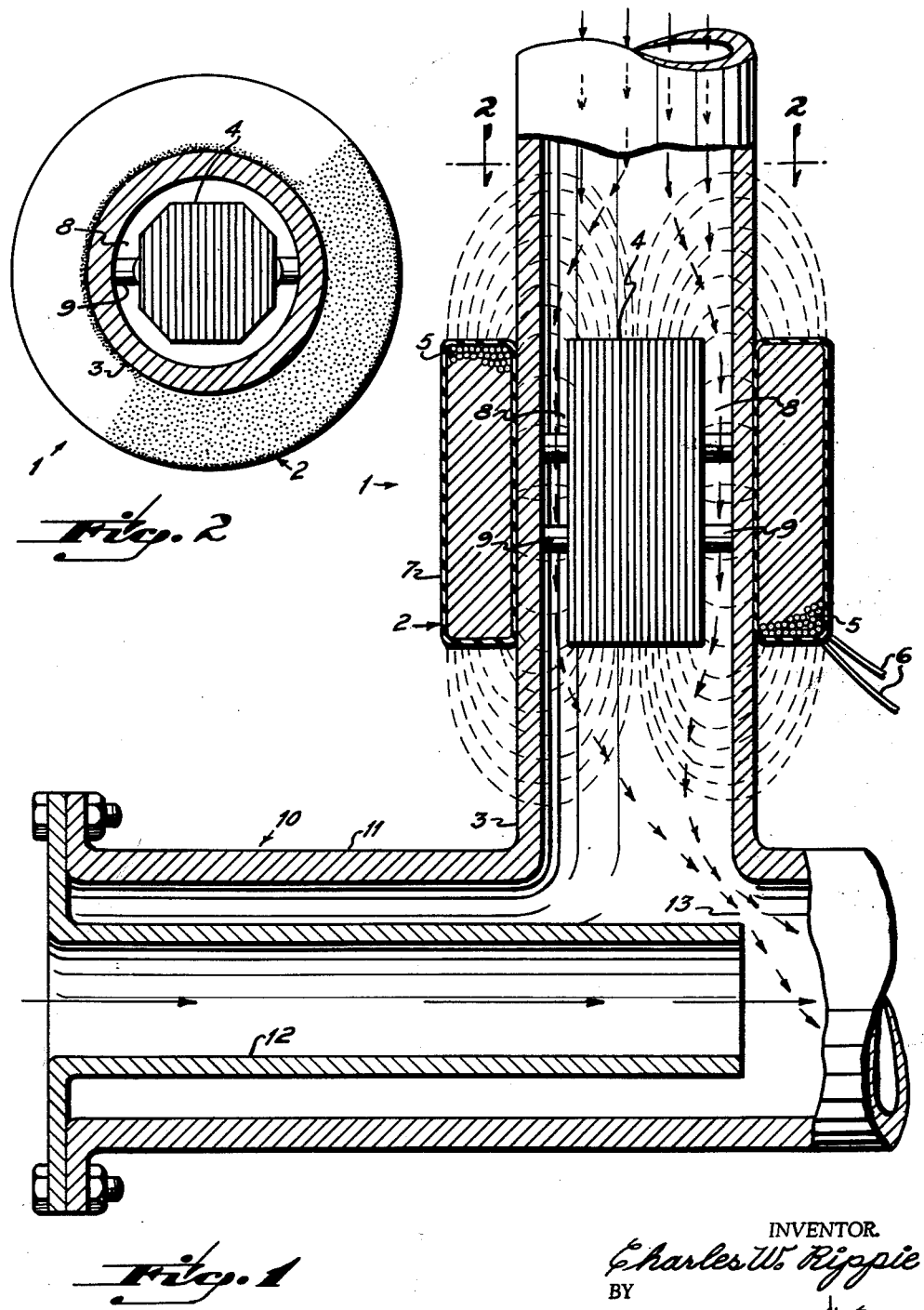
FIGURE 1 is a longitudinal cross sectional view of a preferred apparatus in accordance with the invention for treating oxygen, which apparatus is connected to an eductor for mixing activated oxygen with a liquid stream.
FIGURE 2 is a transverse cross sectional view taken on line 2—2 of FIGURE 1.

A preferred embodiment of the apparatus I have invented for magnetically activating oxygen is shown in FIGURES 1 and 2 and is designated generally by the numeral 1. As can be seen, it is of simple construction. An electromagnet coil 2 is mounted or formed around a nonmagnetic pipe, tube or duct 3, in which there is disposed a ferromagnetic core 4. The coil 2 is comprised of many turns of electric wire 5, the coil leads being designated by 6. The coil 2 may be annular or cylindrical in form, and is preferably positioned immediately about the surface of the pipe 3. The coil is enclosed in an insulated protective casing 7, and may be integral with the tube 3. The tube is preferably made of stainless steel, aluminum or plastic, and is penetrated by the magnetic field which is established upon energization of the coil.

The core 4 is somewhat smaller in diameter than the inside diameter of the pipe 3, for example about ¼ smaller, although the relationship is not critical, and a space 8 is defined between the core and the inside wall of the pipe. The core 4 is preferably approximately as long as the coil 2. It is centrally positioned in the pipe by support arms 9. Although when the coil 2 is energized the core 4 will tend to be supported by the field without additional support, the support arms 9 will however prevent the core from dropping from position when the coil is not energized. The core 4 is made of a ferromagnetic material such as soft iron in which magnetism is induced when the coil is energized. It may be laminated as shown to reduce eddy currents therein when the coil is energized by an alternating current.

The coil may be energized by either alternating or direct current. The strength of the magnetic field does not appear to be highly critical, although very weak fields would not be effective. Upon energization of the coil, a magnetic field is established in the pipe having the general form indicated by the dotted flux lines in the drawing. As indicated by the arrows, oxygen or air flowing in the pipe passes between the core and the inside wall of the pipe, through the space 8, traversing the magnetic field as it does so.

As a specific example of the construction of one such apparatus, a coil 4" long comprised of 10,000 turns of wire was fixed around a 1⅛" I.D. stainless steel pipe. A roughly octagonal core about 4" long and ⅞" diameter was set loosely in the pipe. Air was pumped through the pipe at the rate of 25 cubic feet per minute, or, otherwise put, the air in the space 8 between the core and coil was changed approximately 21,600 times per minute. The coil was energized with 110 volt alternating current and drew 1 ampere. The oxygen passed through this apparatus at these conditions was sufficiently activated that, for example, it readily oxidized mercaptans in a liquid stream at room temperature, as will be described more fully hereinafter, which it would not otherwise do. As a second illustration, when such an apparatus was incorporated in the intake manifold of an automobile engine and the coil was energized, the efficiency of combustion in the engine increased, and was manifested by an increase in engine speed.

Either bottle or atmospheric oxygen may be pumped through the tube to be activated, and it is also contemplated that oxygen dissolved in a liquid may be activated by pumping the liquid in which it is dissolved through the tube. It is to be observed where gaseous oxygen is pumped through the apparatus, that although it is activated as it passes between the coil and the core, it is not necessarily reacted at that point, reaction usually taking place at a point removed from the apparatus to which the oxygen is caused to flow. This will be explained in more detail hereinafter.

The enhanced activity of oxygen which is achieved by the use of this apparatus is displayed in various types of oxidation reactions, especially, although not only, in connection with the oxidation of carbon compounds. As one example, such activated oxygen may be utilized to regenerate the caustic or doctor solutions which are commonly used in petroleum refining to remove mercaptans from petroleum fractions.

Mercaptans are generally of the formula RSH, where R is an alkyl group, and are typically present in gasoline and kerosine fractions, in which they are undesirable.

In accordance with conventional techniques, mercaptans are removed from gasoline by mixing the gasoline with an aqueous solution of sodium hydroxide which reacts with the mercaptans to form sodium mercaptide:

$$RSH + NaOH \rightarrow NaRS + H_2O$$

The sodium mercaptide is separated with the hydroxide from the gasoline. By reason of the conversion of the caustic soda to the mercaptide, the NaOH content of the solution gradually diminishes until the solution becomes ineffective and is of no further utility in mercaptan removal, and is discarded or sold at a very low price. This is well known in the petroleum refining art.

I have found that by means of the present invention, spent caustic solutions of this type may easily and economically be regenerated for reuse. The sodium mercaptides in the caustic solution are not readily oxidizable, but if oxygen which has been magnetically activated in accordance with the present technique is admixed with the spent caustic solution the mercaptides are oxidized at ambient temperature:

$$2Na(RS) + \frac{1}{2}O_2 + H_2O \rightarrow R_2S_2 + 2NaOH$$

In the above formula, the symbol $\frac{1}{2}O_2$ is intended to mean oxygen which has been magnetically activated in the apparatus of this invention. This oxygen oxidizes the mercaptide sulfur to form the alkyl disulfide $R_2S_2$ which rises to the top of the caustic solution and may readily be separated from it. The mercaptides having thus been removed, the caustic solution may be reused. In the absence of magnetic activation of the oxygen, it is much more difficult and expensive to oxidize the mercaptide sulfur.

The mercaptans present in kerosine fractions are higher boiling, the alkyl group containing ten or more carbon atoms. The removal of such mercaptans from kerosine is conventionally effected by contacting the kerosine fraction with a doctor solution comprising lead oxide PbO dissolved in a NaOH solution. Upon admixing the lead oxide-containing doctor solution with mercaptan-containing kerosine, the mercaptans react with the oxide:

$$2RSH + PbO \rightarrow Pb(SR)_2 + H_2O$$

to form soluble lead mercaptide. Elemental sulfur is added to the mixture to convert the lead mercaptide to the alkyl disulfide:

$$Pb(SR)_2 + S \rightarrow R_2S_2 + PbS$$

Lead sulfide accumulates in the doctor solution as the lead oxide is consumed. In the past it has been uneconomical to regenerate the oxide from the sulfide, and the doctor solution has usually just been discarded after a short period of use.

I have found that doctor solutions containing lead sulfide may be regenerated so that lead oxide is reformed by the action of magnetically activated oxygen. When such oxygen is added to the spent doctor solution at ambient temperature, the oxygen oxidizes the sulfide sulfur to thiosulfate sulfur:

$$2PbS + 4(\tfrac{1}{2}O_2) + 2NaOH \rightarrow 2PbO + Na_2S_2O_2 + H_2O$$

Caustic soda is consumed and soluble sodium thiosulfate is produced. The lead oxide content of the doctor solution is thus restored, and the solution may be reused. The regenerating reaction is preferably carried out at an ambient temperature (e.g. 70° F.) and approximately 60 cubic feet of activated oxygen are needed for the conversion of a pound of lead oxide. This may be contrasted with past techniques for regenerating spent doctor solutions, in which 200–300 cubic feet of unactivated oxygen were added to the solution at a temperature of about 200° F. to convert each pound of lead oxide.

FIGURE 1 of the drawing shows the magnetic activating apparatus 1 connected to a preferred type of mixing apparatus 10 whereby activated oxygen produced in the apparatus 1 can be added to a caustic or doctor solution to regenerate it. The pipe 3 of the apparatus 1 is connected at right angles to a pipe 11 containing the doctor or caustic solution which is to be regenerated. The pipe 11 is provided with an eductor tube 12 of smaller diameter which terminates adjacent the right side of tube 3. The solution which is to be regenerated is pumped through the eductor tube 12 from the left side thereof entering from connecting means not shown, and passes through the eductor tube into the pipe 11 through the right end of the eductor. Air containing activated oxygen from apparatus 1 is intimately mixed with the solution to be regenerated as it flows through the neck 13 around the right end of the eductor, a pressure drop being established by the restriction at that point, and the reaction is quickly effected.

The regeneration of spent caustic and doctor solutions of the types used in the removal of mercaptans from gasoline and kerosine fractions, as effected by this invention, provides the petroleum industry with a low cost method of regenerating solutions which otherwise would be of little value. As compared with other alternatives, the cost of the apparatus itself is small. It can be operated on 110 v. alternating current, and the use of atmospheric oxygen minimizes operating costs.

The difficulties of ionizing gaseous oxygen are well known, and it is quite surprising that the chemical activity of such oxygen can be enhanced by treating it in the simple apparatus I have discovered. An improvement in activity is however manifest. This may be seen by the following comparative data, reflecting the results of tests in which two liters of spent caustic solution at room temperature were contacted with atmospheric oxygen passed through the apparatus. In one series of tests the coil was energized with direct current, and in the other test it was not energized. Samples tested every five minutes showed mercaptan concentrations in grams per liter as follows:

| Test No. | G.p.l. RSH No Current | G.p.l. RSH With Current |
|---|---|---|
| 1 | 6.08 | 5.76 |
| 2 | 6.08 | 4.80 |
| 3 | 5.92 | 4.00 |
| 4 | 5.92 | 3.84 |
| 5 | 5.76 | 3.50 |
| 6 | 5.76 | 2.93 |

When the magnetic apparatus was not activated, the concentration of mercaptans was reduced only very slightly by oxidation with admixed gaseous oxygen. When the coil was energized, the mercaptan concentration dropped quickly and continued to drop over the duration of the test.

When the coil was energized with alternating current in a similar test the results were excellent:

| Test No.: | G.p.l. RSH |
|---|---|
| 0 | 7.64 |
| 1 | 5.74 |
| 2 | 4.16 |
| 3 | 3.85 |
| 4 | 2.88 |
| 5 | 1.60 |
| 6 | 1.28 |

The present process may be used in generally similar manner to regenerate spent alkylation sulfuric acid, wherein the magnetically activated oxygen oxidizes the various esters present in such acid, e.g. butyl hydrogen sulfonate, producing carbon dioxide as one product.

As another illustration, the activation technique of the present invention can also be utilized in connection with the production of asphalt, to produce asphalt which has a relatively higher acid number and which demonstrates improved adhesion to mineral aggregates.

As is well known, asphalt is produced in conventional practice by "blowing" or forcing air through heavy residue stocks at an elevated temperature, for example about 250°–400° F., whereby a portion of the carbon in the stock is removed as carbon dioxide, $$C_xH_y + O_2 \rightarrow CO_2 + C_{x-1}H_y$$

whereby the stock becomes heavier and thicker and displays a higher softening point and a lower penetration. The so-called acid number of an asphalt is its acidity expressed in terms of the number of milligrams of potassium hydroxide, KOH, required to neutralize the acid which is present in one gram of the asphalt. The acid number test procedure is also well known and needs no further description herein.

The acid number of an asphalt is an indication of the strength with which that asphalt will adhere to an aggregate, higher acid numbers indicating greater adhesion. While blowing makes an asphalt harder, it does not significantly affect the acid number of the asphalt; acid content usually is neither substantially increased nor reduced. The acid number of a typical blown asphalt is about 0.1. It is presently conventional to mix an additive, the cost of which is high, with the asphalt to increase its acid number and thereby improve its adhesion.

I have found that the acid number of asphalt is raised, and its adhesion is improved, if the air with which the heavy residue stock is blown is subjected to treatment in apparatus in accordance with this invention. The oxygen in the air is activated by the magnetic field between the coil and core of the apparatus, and oxidizes some of the carbon in the stock to form carboxyl groups:

$$C_mH_n + 2(\tfrac{1}{2}O_2) \rightarrow C_{m-1}H_{n-1}COOH$$

In other words, acidic compounds are actually produced in the asphalt, as a result of which adhesion of the asphalt is improved. The softening point and penetration of the asphalt are not significantly affected as the acidification takes place.

In one comparative test, an asphalt having an acid number of 0.1 was produced by blowing a heavy residue stock in conventional manner. By blowing another sample of the same stock with air which had been passed through the apparatus which I have discovered, an asphalt was produced which had the same penetration and softening point, but which had an acid number of about 0.5.

An especially important aspect of this invention is in connection with the combustion of hydrocarbon fuels. I have found that atmospheric oxygen which has been activated as hereinbefore described will effect more complete combustion of hydrocarbon fuels.

When a hydrocarbon fuel is burned, whether it is gasoline, kerosine, or a heavy fuel, both carbon monoxide and carbon dioxide are usually formed:

$$C_aH_b + O_2 \rightarrow CO + CO_2 + H_2O + \text{heat}$$

However, only about ⅓ as much heat is produced in the formation of carbon monoxide as is produced in the formation of the dioxide, and it is therefore highly desirable that the oxidation of the carbon be as complete as possible.

When air which is to be admixed or which is admixed with a vaporized fuel is treated in the present apparatus, the activated condition of the oxygen causes it thereafter to effect more complete combustion of the fuel upon ignition, so that a greater proportion of carbon dioxide is produced and more heat is released. The increase in efficiency will depend upon the type of fuel, the conditions of combustion in the engine, and other factors which are difficult to evaluate specifically, but nonetheless an improvement in the performance of the engine is observable. The tube 3 of the apparatus 1 may, for example be incorporated into the intake or the manifold of an engine, so that the oxygen content of the air is activated prior to admixture with the fuel.

While I have described the preferred embodiment of my invention, it is to be understood that the invention is susceptible of various modifications and variations within the scope of the claims which follow.

What is claimed is:

1. A method of promoting an oxidation reaction wherein gaseous oxygen is combined with an oxidizable material, said method comprising, subjecting gaseous oxygen to a magnetic field in a space between an energized electromagnet coil and a core, and thereafter admixing said oxygen with said oxidizable material under oxidizing conditions.

2. A method of promoting an oxidation reaction between gaseous oxygen and an oxidizable material, said method comprising, pumping gaseous oxygen through a space between an energized electromagnet coil and a ferromagnetic core wherein a magnetic field exists, and thereafter contacting said oxygen with said oxidizable substance at reaction conditions.

3. The method of claim 2 wherein said oxygen is atmospheric oxygen.

4. A method of promoting an oxidation reaction between gaseous oxygen and an oxidizable material, said method comprising, pumping oxygen through a nonmagnetic pipe in which a magnetic core is disposed and around which an electromagnet coil is disposed, a magnetic field being established inside said pipe around said core, and thereafter mixing said oxygen with said oxidizable material at oxidizing conditions.

5. The method of claim 4 wherein said oxidizable material is sulfide sulfur in an alkaline solution.

6. The method of claim 4 wherein said oxidizable material is sodium mercaptide.

7. The method of claim 4 wherein said oxidizable material is a hydrocarbon fuel.

8. The method of claim 4 wherein said oxidizable material is a heavy petroleum residue.

9. The method of claim 4 wherein said oxidizable material is in liquid form and wherein said oxygen is admixed with said liquid through an eductor.

10. The method of claim 4 wherein said coil is a coil of about 10,000 turns and is energized with about 1 ampere of alternating current.

11. A method of regenerating a spent doctor solution containing lead sulfide and sodium hydroxide, said method comprising, pumping air through a nonmagnetic pipe in which a magnetic core is disposed and around which an electromagnet coil is disposed, a magnetic field being established inside said pipe around said core, and mixing said air with said doctor solution whereby lead oxide is formed.

12. The method of regenerating a spent caustic solution containing sodium mercaptides, said method comprising, pumping air through a nonmagnetic pipe in which a magnetic core is disposed and around which an electromagnet coil is disposed, a magnetic field being established inside said pipe around said core, whereby the oxygen in said air is made more chemically reactive, and mixing said air with said caustic solution whereby said mercaptides are converted to corresponding alkyl disulfides.

13. The method of claim 4 wherein said oxidizable material comprises organic esters admixed with sulfuric acid.

14. A method of regenerating sulfuric acid which has previously been used in sulfuric acid alkylation of hydrocarbons, said method comprising, flowing gaseous oxygen through an electromagnetic field established within a conduit, thereafter admixing said oxygen with said alkylation acid, and recovering sulfuric acid of improved strength.

15. A method of regenerating sulfuric acid subsequent to use of said acid in an alkylation process, said method comprising, flowing gaseous oxygen through an electromagnetic field established within a conduit, said field being established by a coil of substantially 10,000 turns around said conduit through which coil an electric current of substantially 1 ampere passes, thereafter admixing said oxygen with said acid, and recovering sulfuric acid of greater strength than the unregenerated acid.

16. Apparatus for promoting the reaction of oxygen with a material reactable therewith, comprising: a treating zone having side walls defining an elongated passageway, an oxgyen inlet means at one end of said treating zone, an oxygen outlet means at the opposite end of said treating zone, an electromagnet, surrounding said treating zone, connected to a suitable source of electrical enrgy, a ferromagnetic core disposed within said treating zone and at least partially within said coil, a reaction zone connected intermediate its ends to said oxygen outlet means, an inlet means for the material, reactable with oxygen, at one end of said reaction zone, and an outlet means for said material, reactable with oxygen, at the opposite end of said reaction zone.

17. Apparatus in accordance with claim 16 wherein the treating zone is an elongated tubular passageway.

18. Apparatus in accordance with claim 17 wherein the tubular passageway is a stainless steel pipe.

19. Apparatus in accordance with claim 16 wherein the length of the core is substantially equal to the length of the electromagnetic coil.

20. Apparatus in accordance with claim 16 wherein the diameter of the core is about three-quarters of the inside diameter of the treating zone.

21. Apparatus in accordance with claim 16 wherein the core is a laminated soft iron core.

22. Apparatus in accordance with claim 16 wherein the core is rigidly mounted inside the treating zone.

References Cited by the Examiner

UNITED STATES PATENTS

| | | | |
|---|---|---|---|
| 1,895,489 | 1/33 | Ruben | 204—168 |
| 2,532,554 | 12/50 | Joeck | 261—1 |
| 2,652,925 | 9/53 | Vermeiren | 204—155 |
| 2,732,338 | 1/56 | Moody | 204—169 |

FOREIGN PATENTS 528 of 1873    8/73    Great Britain.

OTHER REFERENCES

Glockler and Lind: The Electrochemistry of Gases (1939), pages 124 and 125.

WINSTON A. DOUGLAS, *Primary Examiner.*

JOSEPH REBOLD, JOHN H. MACK, *Examiners.*

---

UNITED STATES PATENT OFFICE
CERTIFICATE OF CORRECTION

Patent No. 3,186,929                                         June 1, 1965

Charles W. Rippie

It is hereby certified that error appears in the above numbered patent requiring correction and that the said Letters Patent should read as corrected below.

Column 3, line 65, the formula should appear as shown below instead of as in the patent:

$$2PbS + 4(1/2\ O_2) + 2NaOH \longrightarrow 2PbO + Na_2S_2O_3 + H_2O$$

Signed and sealed this 10th day of May 1966.

(SEAL)
Attest:

ERNEST W. SWIDER                                          EDWARD J. BRENNER
Attesting Officer                                        Commissioner of Patents

UNITED STATES PATENT OFFICE
CERTIFICATE OF CORRECTION

Patent No. 3,186,929                                                June 1, 19(

Charles W. Rippie

It is hereby certified that error appears in the above numbered pat ent requiring correction and that the said Letters Patent should read as corrected below.

Column 3, line 65, the formula should appear as shown below instead of as in the patent:

$$2PbS + 4(1/2\ O_2) + 2NaOH \longrightarrow 2PbO + Na_2S_2O_3 + H_2O$$

Signed and sealed this 10th day of May 1966.

(SEAL)
Attest:

ERNEST W. SWIDER
Attesting Officer                                        EDWARD J. BRENNER
                                                                        Commissioner of Paten